(12) United States Patent
Billman et al.

(10) Patent No.: US 7,428,637 B1
(45) Date of Patent: Sep. 23, 2008

(54) DYNAMIC AUTHENTICATION AND INITIALIZATION METHOD

(76) Inventors: Richard E. Billman, 3 Old Balcom Farm Dr., Nashua, NH (US) 03062; Ron Lee, 3 Old Balcom Farm Dr., Nashua, NH (US) 03062

( * ) Notice: Subject to any disclaimer, the term of this patent is extended or adjusted under 35 U.S.C. 154(b) by 687 days.

(21) Appl. No.: 10/903,987

(22) Filed: Jul. 30, 2004

Related U.S. Application Data

(60) Provisional application No. 60/490,952, filed on Jul. 30, 2003.

(51) Int. Cl.
- H04L 9/00 (2006.01)
- H04L 9/32 (2006.01)
- G06F 15/16 (2006.01)
- H04M 1/66 (2006.01)

(52) U.S. Cl. .......... 713/168; 713/170; 726/3; 705/67; 455/411; 380/279; 380/281; 380/282

(58) Field of Classification Search .......... 713/155, 713/168–170; 726/3; 709/220; 705/67; 455/411; 380/279, 281–282; 707/9
See application file for complete search history.

(56) References Cited

U.S. PATENT DOCUMENTS 4,458,109 A * 7/1984 Mueller-Schloer ........... 380/30
5,124,117 A * 6/1992 Tatebayashi et al. ........ 380/281
7,107,242 B1 * 9/2006 Vasil et al. .................... 705/39

OTHER PUBLICATIONS

B. Schneier, Applied Cryptography, Oct. 1995, John, Wiley and Sons, Inc., Second Edition, pp. 59-60.*

* cited by examiner

*Primary Examiner*—Minh Dieu Nguyen
(74) *Attorney, Agent, or Firm*—Russ Weinzimmer & Associates; Russ Weinzimmer

(57) ABSTRACT

A method for authentication of a first client in communication with a second client via an authentication server is disclosed, such that the first client and the second client are authenticated to each other, and the authentication server is authenticated to both the first client and the second client. The ability of a client and an authentication server to generate a one-time-use key unique to the client for a given request, is used as the basis for authentication. The flow of requests and responses coupled with each client's unique one-time-use key, such as a one time use account number used to encrypt messages, results in all three entities, the two clients and the authentication server, mutually authenticating each other. The method effectively prohibits a "man-in-the-middle" attack, wherein an unauthorized entity tries to assume the roll of one of the two clients, or the authentication server.

20 Claims, 3 Drawing Sheets

DYNAMIC AUTHENTICATION AND INITIALIZATION METHOD

CROSS-REFERENCE TO RELATED APPLICATIONS

This application claims the benefit of U.S. Provisional Application No. 60/490,952 filed, Jul. 30, 2003.

FIELD OF THE INVENTION

This invention relates to data communications security, and particularly to authentication and initialization of a user or resource over a communications medium.

BACKGROUND OF THE INVENTION

The introduction of electronic communications and e-commerce have highlighted the need for security for all forms of data and communications exchange. Hackers and Con Artists have been able to perpetrate fraud and ID theft by intercepting communications, costing individuals and businesses in the U.S. billions of dollars. In many cases fraud has been executed even when encryption systems are part of the solutions architecture. Strong dynamic authentication is needed to ensure non-repudiation of the entity requesting access to sensitive information or for executing privileged transactions.

The majority of e-Commerce and financial transactions executed on-line allow simple username and password schemes for authenticating users over a secure protocol. In many e-Commerce applications a user's name and password is static (unchanged) for a long period of time. In addition, if an authentication method is not intuitive and non-intrusive for users, businesses and individuals alike will not effectively use them. The most recent vulnerabilities in certain implementations of the Secure Socket Layer (SSL) Protocol demonstrated the high risk to sensitive information using simple username and password schemes in the event the secure protocol is compromised.

Simply providing user credentials, without a method to dynamically change the credential values (such as by providing one-time-use keys) provides opportunity for capture and unauthorized reuse. This, however, poses a problem: until now, dynamic authentication and session initialization methods have required large overhead and user protection of their credentials and secrets. Experience has proven that hackers and con artists can easily get users to disclose or share their authentication credentials with simple deception tactics.

BRIEF SUMMARY OF THE INVENTION

The ability of a client and an authentication server to generate a one-time-use key, such as a one-time account number unique to the client for a given request, is used as the basis for authentication. In all situations there are two clients that want to interact, and want to authenticate each other, and there is an authentication server that both clients would also like to validate as authenticated. The flow of requests and responses coupled with each client's unique one-time-use key, such as a one time use account number, used to encrypt messages, results in all three entities, the two clients and the authentication server, mutually authenticating each other. The method also effectively prohibits a "man-in-the-middle" attack, wherein an unauthorized entity tries to assume the roll of one of the two clients, or the authentication server.

Accordingly, one general aspect of the invention is a method for authentication of a first client in communication with a second client via an authentication server, such that the first client and the second client are authenticated to each other, and the authentication server is authenticated to both the first client and the second client. The method includes a sequence of acts, including the first client generating a one-time-use key unique to the first client, and encrypting a request with the one-time-use key unique to the first client to provide a first client encrypted request. Then, the first client communicates to the second client the first client encrypted request, along with a first client time stamp, and a first client identification datum. Next, the second client generates a one-time-use key unique to the second client, and encrypts the first client time stamp and the first client identification datum using the one-time-use key unique to the second client to provide a second client encrypted first client time stamp and a second client encrypted first client identification datum. Then, the second client communicates to the authentication server the second client encrypted first client time stamp and the second client encrypted first client identification datum. Subsequently, the authentication server generates a one-time-use key unique to the second client, and uses the one-time-use key unique to the second client for decrypting the first client time stamp and the first client identification datum. Next, the authentication server generates the one-time-use key unique to the first client, and using the one-time-use key unique to the first client, encrypts the one-time-use key unique to the second client so as to provide an authentication server encrypted one-time-use key unique to the first client. Then, the authentication server communicates to the second client the authentication server encrypted one-time-use key unique to the first dient. Then, the second client decrypts the one-time-use key unique to the first client using the one-time-use key unique to the second client. Next, the second client decrypts the first client encrypted request using the one-time-use key unique to the first client to provide the first client request, and using the first client request to perform the first client request, so as to provide a second client service result. Then, the second client encrypts the second client service result so as to provide an encrypted second client service result. Next, the second client communicates the encrypted second client service result to the first client.

In a preferred embodiment, the one-time-use key unique to the first client is a one-time account number unique to the first client. In another preferred embodiment, the one-time-use key unique to the first client is a one-time use credit card number unique to the first client. In another preferred embodiment, the one-time-use key unique to the second client is a one-time use credit card authorization number unique to the second client.

In yet another preferred embodiment, the requested service is a request for a document. In an alternate embodiment, the requested service is a request for the first client to be connected to a network of the second client. In yet another embodiment, the requested service is a request to set up a secure communication channel between the first client and the second client.

In further preferred embodiments, the requested service is a request to connect the first client to a second client serving as an email server, and the requested service is a request to connect the first client to a second client serving as a database.

In another preferred embodiment, the method includes enrolling the first client on the authentication server. The method can also include enrolling the second client on the authentication server. In a preferred embodiment, enrolling includes issuing a credit card.

In a preferred embodiment, after enrolling, software is communicated from the authentication server to the first client, for enabling the first client to participate in authentication.

In another preferred embodiment, when the first client participates in authentication, the first client synchronizes keys with the authentication server.

In alternate preferred embodiment when the first client synchronizes keys with the authentication server, the keys are master private keys.

In yet further preferred embodiments, the method includes authenticating at least one user to one of the first client and the second client. In variants of this, authenticating can include using a PIN number, and/or using a biometric process, and/or using a password, and/or using a smart card.

Thus, dynamic authentication and session initialization methods are provided that do not require large overhead, while providing protection of the credentials and secret information of users. Consequently, hackers and con artists can no longer easily get users to disclose or share their authentication credentials with simple deception tactics.

The method of the invention provides continuous non-repudiation, session initialization, and protection of users' credentials from unauthorized access or monitoring.

BRIEF DESCRIPTION OF THE DRAWINGS

The invention will be more fully understood by reference to the detailed description, in conjunction with the following figures, wherein.

DETAILED DESCRIPTION

The method of the invention provides dynamic authentication and session initialization that dynamically changes credentials by employing one-time-use keys. Thus, the invention does not require key exchange, complex infrastructure or user intervention.

The invention provides a new method for strong authentication of human and hardware participants ("user") over any communication channel (voice, data or video) through a software mechanism that introduces randomness by means of the use of pseudo-random one-time-use keys, and thereby ensures reliable secure authentication.

The method of dynamic authentication of the invention generates one-time keys on both the user's device and Authentication Server (AS), using those keys for authentication and encryption of requests and data. The user initiates the software process by authenticating to the device using current practices, such as through a personal identification number (PIN), software key, a biometric process (BP) (e.g., fingerprint, retina scan, hand-print scan), hardware unique identifier or a combination of one or more of these processes.

The following description of a possible implementation is provided to clarify the claimed functionality.

A user first enrolls theirlits identity to an authentication server (AS) and to the provider of a service (SP), using a telephone, Internet connection or in-person, as selected by the purchaser of the technology depending on business practices and security needs.

Upon completion of enrollment, the Authentication Server (AS) connects to the user's device (e.g., Computer, Personal Digital Assistant (PDA), Wireless phone (a "Device")) and provides the client-side software containing the invention, as well as providing synchronization.

Figure 4:
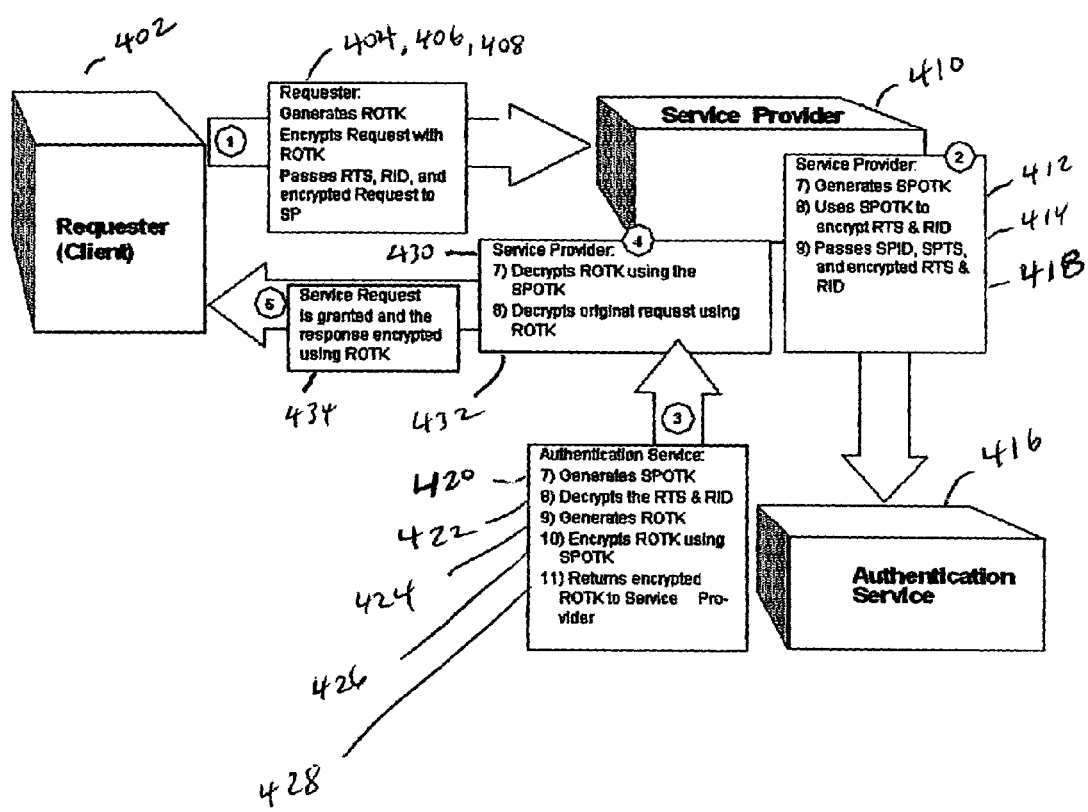
FIG. 4 is a flow diagram of the dynamic authentication and initialization method of the invention.

The client-side software includes a master private key (identical to the master private key assigned to the user on the AS, thereby accomplishing the needed synchronization) and a user ID (UID) (which can be any number or alphanumeric string, but does not contain any private information of the user). Upon initialization of the client-side software on the device that will be used to request restricted data, the method, as shown in FIG. 4, provides dynamic authentication as follows, for the case wherein a one-time account number (OTA) serves as a Requester One-Time Key (ROTK):

Referring to FIG. 4, the user 402 (also called the Requester or first client) generates 404 a Requester One-Time Key (ROTK) (also called a one-time account number (OTA) specific to the user ($OTA_1$)), and uses the ROTK ($OTA_1$) to encrypt 406 a request for service, and then sends 408 the request with the Requester Identification (RID) (user's UID) and the Requester Time Stamp (RTS) to the service provider (SP) (also called the second client) 410.

Next, the Service Provider (SP) 410 must authenticate the user. It does this by generating 412 a different one time key, i.e., a Service Provider One Time Key (SPOTK) (also called ($OTA_2$)), then encrypting 414 a request (e.g., the Requester Time Stamp (RTS) and the Requester Identification (RID)) using the SPOTK, and then sending 418 the encrypted request to the Authentication Server 416 (AS), along with the Service Provider Identification (SPID) and the Service Provider Time Stamp (SPTS).

The Authentication Server 416 then generates 420 the Service Provider's SPOTK, and then using the SPOTK, successfully decrypts 422 the Service Provider's request (e.g., the RTS and RID), thereby authenticating the Service Provider 410. The Authentication Server 416 then generates 424 the user's ROTK ($OTA_1$), encrypts it 426 with SP's $OTA_2$, and sends it back 428 to the Service Provider 410.

The Service Provider 410 obtains/reveals the user's ROTK ($OTA_1$) by decrypting 430 the Authentication Server's communication using the SPOTK (SP's $OTA_2$). The Service Provider 410 decrypts 432 user's request using the ROTK (user's $OTA_1$), thereby authenticating User (Requester or first client). The Service Provider then performs the requested service and sends back the result of the service encrypted using the ROTK (user's $OTA_1$) 434.

The ability of the AS to successfully generate matching OTA's and to successfully decrypt requests and encrypt responses using these OTA's, authenticate the AS to the other components.

The method of the invention can be extended and elaborated upon in various ways. For example, synchronization can be accomplished using either a static method, wherein the AS provides the master key, or a dynamic method, wherein when the client contacts the AS for the first time, the master private key is generated by both the client and the AS. In the alternative, existing asymmetric and symmetric technologies for initialization (e.g., PKI, SSL) could be used.

Further, the AS can provide authentication, and can also provide other services along therewith, for example, generation of an initialization seed for secure communications, decryption of requester client request to be returned to the service provider, and providing authorization information.

Each one-time-use key has only a short and finite life-time, such as thirty second. In some embodiments, the life-time is adjustable by the administrator, thereby providing Configurable Credential Persistence.

The one-time-use key can be of any length according to the particular application, and the objectives of the implementer. Likewise, the encryption algorithm selected can be adapted according to the particulars of the application, and the objectives of the implementer.

The implementation of the invention is independent of the selection of the data transport and communications protocols.

The invention assures information security and trusted communication within and between computers, networks, enterprises and domains.

The invention provides data-level security through new strong-factor authentication processes. The invention, without burdening existing computer and enterprise systems, enables authenticated secure communications with trusted individuals, computers, servers and domains within and outside your network.

For strong factor authentication, the invention provides a method for authenticating human and hardware participants ("user") in any communication (voice, data or video) through a combination of processes that create randomness and thus assure reliable secure authentication. A practical implementation of our authentication invention is where the initial user wants a service of some type—communication, or access and related rights to a document, a database, a server, specific content, or other information. Thus, the user wants to authenticate his right to obtain the service.

As an example of this implementation, the user would first enroll his/its identity to an authentication server (AS), using a telephone, Internet connection or in-person meeting, as selected by the purchaser of the technology depending on its business practices and security needs. Enrollment could be comparable to current practices for validating a credit card or enrolling in a merchant's e-commerce program.

Upon completion of enrollment, the AS sends out electronically to the user's device (e.g., server, personal computer (PC), laptop, personal digital assistant (PDA) (a "Device")), for automatic installation, the client-side software containing the technology, including the method to synchronize keys with the AS.

The software includes a means for providing a master private key (identical to the master key assigned to the user on the AS) and a user ID number (UID) (which can be any number, but does not contain any private information of the user). The master private key is used to create the ROTK (Requester One Time Key of FIG. 4) by using a time stamp (RTS), and a "cut function" of the master private key, wherein the "cut function" of the master private key is a section of the master private key.

Dynamic authentication generates symmetric one-time keys on both the Device (also called the Requester or the Client) and the Authentication Server (AS), using those keys for authentication and encrypting messages.

The user initiates the method of the invention by authenticating to the device using current known practices, such as through a personal identification number (PIN), a password (PW), a biometric process (BP) (e.g., fingerprint, retina scan, hand-print scan), swiping a smart card (SC) through an optical reader, or a combination of one or more of these processes.

There are many authentication products that operate independently from key agile encryption processes in private and commercial use today. These separate solutions do not provide the security objective of a dynamic authentication mechanism to initiate a random encryption process.

Without a dynamic authentication process, even key agile encryption technologies must be deployed with static authentication, and thus require use between trusted end points for the communication to be secure.

The invention provides the security benefits of dynamic authentication initializing a dynamic key generation process to provide more reliable secure communications. Unlike static authentication process, the invention permits secure authentication to any device for local or remote connections.

Database Encryption is an advantageous application of the invention. To provide a more complete solution for data level security, one goal of the security solution should be database encryption, in order to restrict access to data where it is usefully stored and retrieved in accordance with the user's intended purposes. One desired objective is to limit access to and retrieval from a database to authorized users. Current security solutions do not combine strong authentication and dynamic encryption processes to achieve this objective.

Trusted Domain Authentication is another advantageous application of the invention. Communication between users accessing public networks from different IP domain addresses presents challenges using current technology practices, insofar as each different user must use an authentication mechanism that is the same as or compatible with the authentication mechanism used by the other.

A desired goal of new authentication solutions should be to permit communications between trusted domains without requiring each user in a separate domain to authenticate directly with a user in the other domain.

The invention facilitates this trusted communication between authenticated domains. Once a user has authenticated to his domain using the method of the invention, he may securely and reliably communicate with any user similarly authenticated to a different domain where the domains authenticate and communicate using the method of the invention.

It is desirable to have the ability to interact in an authenticated manner between domains without having to share the individual entities authentication credentials between domains. Given that entities within a domain will authenticate using the method of the invention, the only thing remaining for authenticated interaction between domains is for the domains themselves to authenticate. This happens exactly the same way normal internal domain authentication occurs with one domain assuming the place of the Requester, the other domain assuming the place of the Service Provider. The Authentication Server will reside within the Service Provider's domain. The flow can just as easily go in the other direction with each end swapping rolls of Requester and Service Provider. This scales nicely and naturally fits in to today's networks without having to change or add to the topology.

Figure 1:
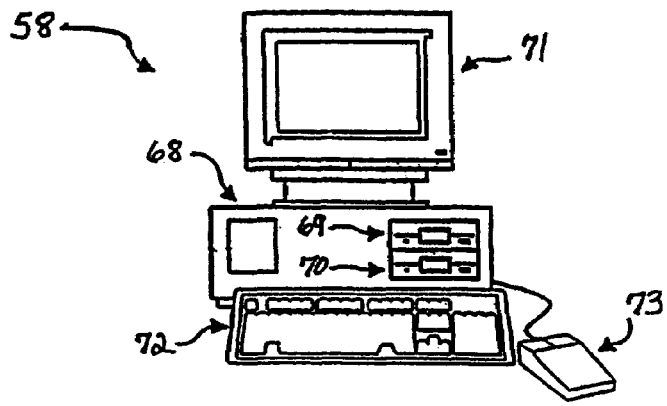
FIG. 1 is a graphical representation of computer system such as can serve as a client or authentication server of the invention.

The present invention is implemented on a computer. FIG. 1 is an illustration of a computer 58 used for implementing the computer processing in accordance with a computer-implemented embodiment of the present invention. The procedures described herein may be presented in terms of program procedures executed on, for example, a computer or network of computers. Viewed externally in FIG. 2, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 3:
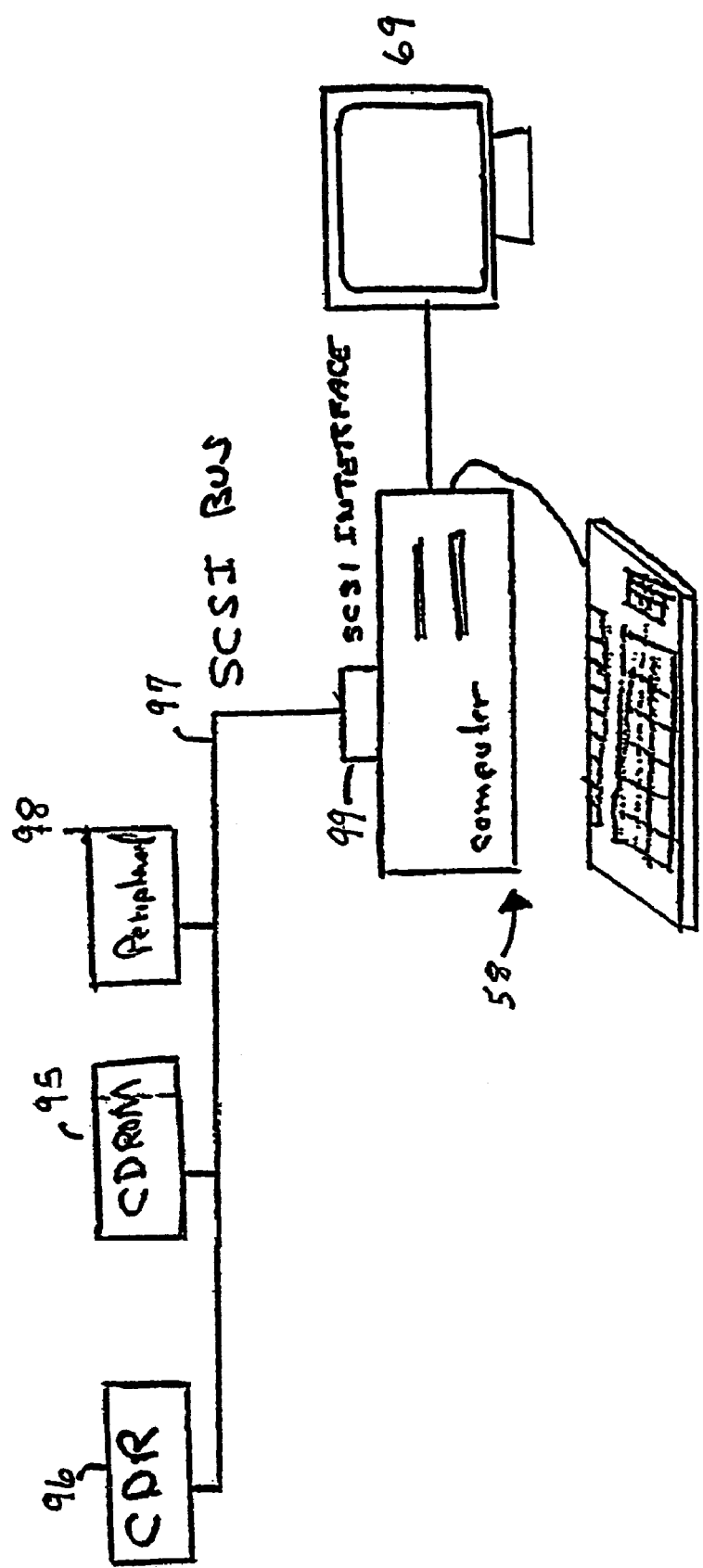
FIG. 3 is a schematic diagram of an alternate architecture of the computer system of claim 1.

Alternatively, referring to FIG. 3, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

Figure 2:
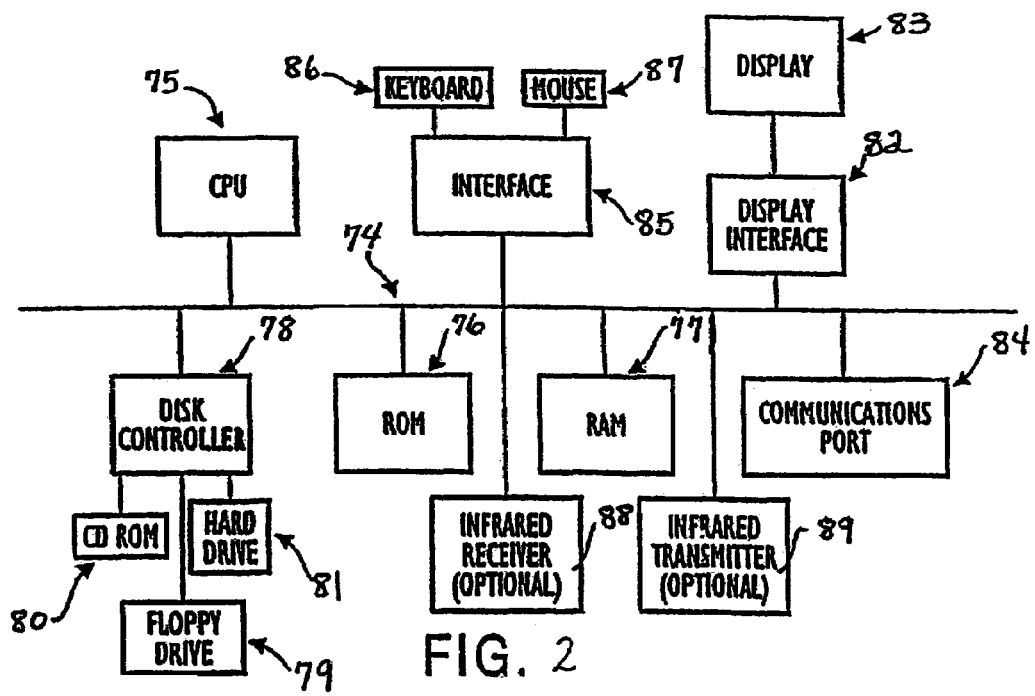
FIG. 2 is a schematic diagram of the architecture of the computer system of FIG. 1.

FIG. 2 illustrates a step diagram of the internal hardware of the computer of FIG. 1. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

The system according to the invention may include a general purpose computer, or a specially programmed special purpose computer. The user may interact with the system via e.g., a personal computer or over PDA, e.g., the Internet, an intranet, etc. Either of these may be implemented as a distributed computer system rather than a single computer. Similarly, the communications link may be a dedicated link, a modem over a POTS line, and/or any other method of communicating between computers and/or users. Moreover, the processing could be controlled by a software program on one or more computer systems or processors, or could even be partially or wholly implemented in hardware.

Further, this invention has been discussed in certain examples as if it is made available to a single user. The invention may be used by numerous users, if preferred. The system used in connection with the invention may rely on the integration of various components including, as appropriate and/or if desired, hardware and software servers, database engines, and/or other content providers.

Although the computer system in FIG. 1 is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

Other modifications and implementations will occur to those skilled in the art without departing from the spirit and the scope of the invention as claimed. Accordingly, the above description is not intended to limit the invention except as indicated in the following claims.

What is claimed is:

1. A method for authentication of a first client in communication with a second client via an authentication server, such that the first client and the second client are authenticated to each other, and the authentication server is authenticated to both the first client and the second client, the method comprising:

the first client the first client generating a one-time-use key unique to the first client, and encrypting a request with the one-time-use key unique to the first client to provide a first client encrypted request;

the first client communicating to the second client the first client encrypted request, along with a first client time stamp, and a first client identification datum;

the second client generating a one-time-use key unique to the second client, and encrypting the first client time stamp and the first client identification datum using the one-time-use key unique to the second client to provide a second client encrypted first client time stamp and a second client encrypted first client identification datum;

the second client communicating to the authentication server the second client encrypted first client time stamp, the second client encrypted first client identification datum, a second client time stamp, and a second client identification datum;

the authentication server generating a one-time-use key unique to the second client, and using the one-time-use key unique to the second client for decrypting the first client time stamp and the first client identification datum;

the authentication server generating a one-time-use key unique to the first client, and using the one-time-use key unique to the second client to encrypt the one-time-use key unique to the first client so as to provide an authentication server encrypted one-time-use key unique to the first client;

the authentication server communicating to the second client the authentication server encrypted one-time-use key unique to the first client;

the second client decrypting the one-time-use key unique to the first client using the one-time-use key unique to the second client;

the second client decrypting the first client encrypted request using the one-time-use key unique to the first client to provide the first client request, and using the first client request to perform the first client request, so as to provide a second client service result;

the second client encrypting the second client service result so as to provide an encrypted second client service result; and the second client communicating the encrypted second client service result to the first client.

2. The method of claim 1, wherein the one-time-use key unique to the first client is a one-time account number unique to the first client.

3. The method of claim 1, wherein the one-time-use key unique to the first client is a one-time use credit card number unique to the first client.

4. The method of claim 1, wherein the one-time-use key unique to the second client is a one-time use credit card authorization number unique to the second client.

5. The method of claim 1, wherein the requested service is a request for a document.

6. The method of claim 1, wherein the requested service is a request for the first client to be connected to a network of the second client.

7. The method of claim 1, wherein the requested service is a request to set up a secure communication channel between the first client and the second client.

8. The method of claim 1, wherein the requested service is a request to connect the first client to a second client serving as an email server.

9. The method of claim 1, wherein the requested service is a request to connect the first client to a second client serving as a database.

10. The method of claim 1, further comprising:
enrolling the first client on the authentication server.

11. The method of claim 10, wherein enrolling includes:
issuing a credit card.

12. The method of claim 1, further comprising:
enrolling the second client on the authentication server.

13. The method of claim 1, further comprising:
after enrolling, communicating software from the authentication server to the first client, for enabling the first client to participate in authentication.

14. The method of claim 13, wherein when the first client participates in authentication, the first client synchronizes keys with the authentication server.

15. The method of claim 14, wherein when the first client synchronizes keys with the authentication server, the keys are master private keys.

16. The method of claim 1, further including: authenticating at least one user to the second client.

17. The method of claim 16, wherein authenticating includes:
using a PIN number.

18. The method of claim 16, wherein authenticating includes:
a biometric process.

19. The method of claim 16, wherein authenticating includes:
a password.

20. The method of claim 16, wherein authenticating includes:
using a smart card.

* * * * *